(12) United States Patent
Kim et al.

(10) Patent No.: US 10,289,497 B2
(45) Date of Patent: May 14, 2019

(54) DISTRIBUTED FILE SYSTEM

(71) Applicant: Electronics and Telecommunications Research Institute, Daejeon (KR)

(72) Inventors: Young Chul Kim, Daejeon (KR); Young Kyun Kim, Daejeon (KR); Sang Min Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 459 days.

(21) Appl. No.: 15/073,072

(22) Filed: Mar. 17, 2016

(65) Prior Publication Data

US 2016/0274980 A1   Sep. 22, 2016

(30) Foreign Application Priority Data

Mar. 20, 2015 (KR) .................. 10-2015-0039017

(51) Int. Cl.
*G06F 17/30* (2006.01)
*G06F 11/14* (2006.01)

(52) U.S. Cl.
CPC ...... *G06F 11/1464* (2013.01); *G06F 11/1453* (2013.01); *G06F 11/1451* (2013.01); *G06F 2201/825* (2013.01); *G06F 2201/84* (2013.01)

(58) Field of Classification Search
CPC ............. G06F 11/1464; G06F 11/1453; G06F 17/30303; G06F 11/1451; G06F 2201/825; G06F 2201/84
USPC ........................................................... 707/639
See application file for complete search history.

(56) References Cited

U.S. PATENT DOCUMENTS

| | | | |
|---|---|---|---|
| 6,829,617 B2 | 12/2004 | Sawdon et al. | |
| 7,085,785 B2 | 8/2006 | Sawdon et al. | |
| 8,423,732 B1 | 4/2013 | Rajan | |
| 2003/0158834 A1* | 8/2003 | Sawdon | G06F 17/30067 |
| 2004/0083345 A1 | 4/2004 | Kim et al. | |
| 2005/0065986 A1* | 3/2005 | Bixby | G06F 17/30088 |
| 2007/0061641 A1 | 3/2007 | Yoon et al. | |
| 2007/0260830 A1* | 11/2007 | Faibish | G06F 3/061 |
| | | | 711/162 |
| 2014/0149698 A1* | 5/2014 | Ezra | G06F 3/0614 |
| | | | 711/162 |
| 2016/0210306 A1* | 7/2016 | Kumarasamy | G06F 17/30174 |

FOREIGN PATENT DOCUMENTS

KR       100912126 B1    8/2009

* cited by examiner

*Primary Examiner* — Evan Aspinwall
(74) *Attorney, Agent, or Firm* — Rabin & Berdo, P.C.

(57) ABSTRACT

Provided herein is a distributed file system including a meta data server configured to store and manage meta data of a file; and a data server configured to store and manage data and attribute information of the file, wherein, in response to a writing request from a client, the meta data server stores data requested to be changed in a delta chunk of a read-only snapshot file, and connects the original file and the read-only snapshot file in an inode structure.

12 Claims, 15 Drawing Sheets

| LATEST READ-ONLY SNAPSHOT NUMBER | EXTENT NUMBER/READ-ONLY SNAPSHOT NUMBER |
|---|---|
| EXTENT NUMBER/READ-ONLY SNAPSHOT NUMBER | EXTENT NUMBER/READ-ONLY SNAPSHOT NUMBER |
| ⋮ | ⋮ |
| ⋮ | ⋮ |

~218

DISTRIBUTED FILE SYSTEM

CROSS-REFERENCE TO RELATED APPLICATION

The present application claims priority to Korean patent application number 10-2015-0039017, filed on Mar. 20, 2015, the entire disclosure of which is incorporated herein in its entirety by reference.

BACKGROUND

Field of Invention

Various embodiments of the present invention relate to a distributed file system capable of providing a snapshot of a file level, and more particularly, to a distributed file system configured to manage file data distributed and stored in chunk units with read-only snapshot files or writable snapshot files.

Description of Related Art

A distributed file system is a system configured to store and manage meta data and actual data of a file, separately. In general, meta data is a data that explains another data, and thus is also called attribute data. Meta data is managed in a meta data server, while actual data is distributed and stored in a plurality of data servers. Meta data includes information on the data servers where the actual data is stored.

The meta data server and plurality of data servers have a distributed structure where the servers are connected via a network. Therefore, a client has different paths for approaching the meta data and the actual data of a file. That is, in order to approach a file, the client first has to approach the meta data of the file stored in the meta data server and obtain information on the plurality of data servers where the actual data is stored. Then, inputting and outputting of the actual data is performed through the plurality of data servers.

A snapshot is generally used to support backing up operations at online situations by storing a current state of a file of a certain point at the file system or volume level. Recently, snapshots have been used to enable returning to a snapshot state of a certain time point as a virtual desktop image or a snapshot of a virtual disc is provided in a virtual desktop environment. Snapshots of virtual desktop images have also been used to distribute the virtual desktop images quickly.

In such a case, file-level snapshots capable of mapping and managing virtual desk top images or virtual disks at the file level must be provided in the file-based distributed file system.

SUMMARY

A purpose of the present disclosure is to resolve the aforementioned difficulties of prior art, that is, to provide a distributed file system capable of continuously retaining file data distributed and stored in a data server of the distributed file system in chunk units even after a snapshot is generated while approaching a file data that corresponds to a certain snapshot in order to return to the certain snapshot.

According to an embodiment of the present invention, there is provided a distributed file system including a meta data server configured to store and manage meta data of a file; and a data server configured to store and manage data and attribute information of the file, wherein the meta data server stores data requested to be changed in a delta chunk of a read-only snapshot file in response to a writing request from a client, and connects the original file and the read-only snapshot file in an inode structure.

In the embodiment, the meta data server may set a mode of the snapshot file to a read-only mode, and generate an inode of the read-only snapshot file, copy chunk layout information of the original file or chunk layout information of a formerly generated read-only snapshot file to chunk layout information of an inode of a newly generated read-only snapshot file, generate the delta chunk using the chunk layout information of the inode of the read-only snapshot file, and store inode information of the original file in the inode of the newly generated read-only snapshot file.

In the embodiment, the meta data server may transmit the chunk layout information of the original file to the client in response to a request for chunk layout information transmitted from the client.

In the embodiment, the meta data server may determine whether or not the read-only snapshot file is generated for the first time, analyzes an extent change map of the chunk of the original file in the data server if the read-only snapshot file is generated for the first time, combine a delta chunk that storing data changed after the read-only snapshot file was generated with the chunk of the original file, and delete the read-only snapshot file from the data server.

In the embodiment, the data server may analyze an extent change map of the chunk of the original file if the read-only snapshot file does not generate for first time, and combine the delta chunk storing the data changed after the read-only snapshot file was generated with a delta chunk of a formerly generated read-only snapshot file.

In the embodiment, the data server may analyze an extent change map of an original chunk stored in the data server in response to a request to update the original file, check whether an extent of a location where data is to be written in the chunk of the original file has been changed, and perform a copy-on-write of an extent unit from a delta chunk of a formerly changed read-only snapshot file to a delta chunk of a current read-only snapshot file if the extent of the location has been changed, perform a copy-on-write of extent unit from the delta chunk of the formerly changed read-only snapshot file to the chunk of the original file and delta chunk of the current read-only snapshot file if the extent of the location has not been changed.

In the embodiment, the data server may set a current snapshot number regarding an extent of an extent change map of a chunk of the original file in order to track a location of the latest changed original file.

According to another embodiment of the present invention, there is provided a distributed file system including a meta data server configured to store and manage meta data of a file; and a data server configured to store and manage data and attribute information of the file, wherein the meta data server sets a mode of a snapshot file to one of a read-only mode and writable mode in response to a writing request from a client, and stores data requested to be changed in chunk units according to a result of the setting.

In the embodiment, the meta data server may store the data requested to be changed in a delta chunk of a read-only snapshot file if the mode of a snapshot file is a read-only mode, and connect the original file and the read-only snapshot file in an inode structure.

In the embodiment, the meta data server may store the data requested to be changed to a delta chunk of a writable snapshot file without changing the original file if the mode of a snapshot file is a writable mode, and connect the original file and the writable snapshot file in an inode structure.

In the embodiment, the meta data server may generate an inode of the writable snapshot file, copy chunk layout information of an inode of the original file to chunk layout information of the inode of the writable snapshot file, generate a delta chunk of the writable snapshot file in the data server using the chunk layout information of the inode of the writable snapshot file, and store inode information of the original file in the inode of the writable snapshot file.

In the embodiment, the data server may analyze an extent change map of the writable snapshot delta chunk in response to the writing request and inspects whether an extent for writing data has been changed, write the data in the delta chunk if the extent has been changed, and perform a copy-on-write from the chunk of the original file to the delta chunk if the extent has not been changed.

A distributed file system according to an embodiment of the present disclosure is capable of managing meta data of an original file and snapshot file in a meta data server according to snapshot characteristics, and of processing file data according to the snapshot characteristics in a data server, thereby providing a read-only snapshot file or writable snapshot file at the file level.

Furthermore, a distributed file system according to an embodiment of the present disclosure may provide a meta data server that guarantees consistency of processing meta data of an original file and snapshot, and a data server that performs a transparent inputting and/or outputting operation regarding the original file and snapshot data.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Figure 1:
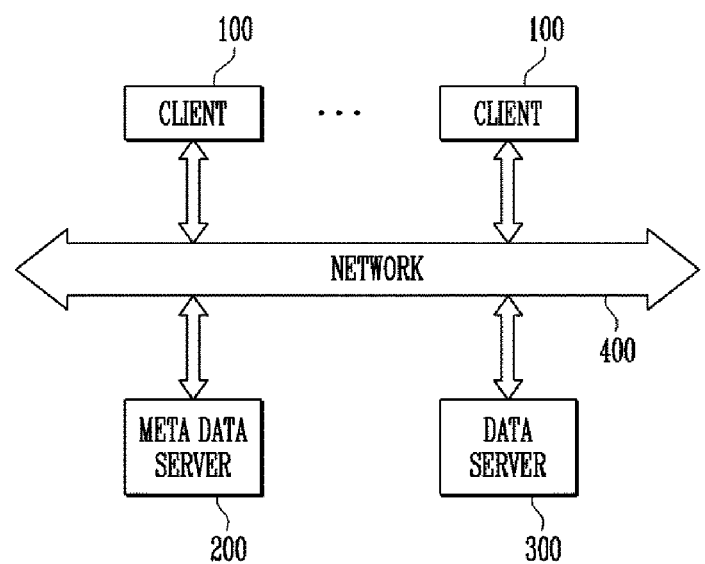
FIG. 1 is a block diagram of a distributed file system according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a block diagram of a distributed file system according to an embodiment of the present disclosure.

Referring to FIG. 1, the distributed file system may include a client 100, meta data server 200, data server 300, and network 400.

The client 100 may write or read data of a file stored in the data server 300 using meta data of the file stored in the meta data server 200.

Meta data is data that includes information on a file. It may also include information on the data server 300 where the file is stored.

For example, the client 100 may analyze the information on the file using the meta data stored in the meta data server 200 to access the data server 300 where the file is actually stored and update the data of the file.

The meta data server 200 may store and manage meta data of all the files of the distributed file system. The meta data server 200 may manage information on states of the data server 300, and when there are a plurality of data servers 300, the meta data server 300 may also store and manage information on states of all the data servers 300.

The data server 300 may store a file, and may perform a reading operation of writing operation of the file according to a request signal received from the client 100.

In an embodiment, the data server 300 may store a file divided into chunks of a certain size. Herein, a chunk is data information divided into a certain unit size, wherein the unit size is modifiable without limitation.

For example, when there are a plurality of data servers 300, a file may be distributed into chunks of a certain size, and then distributed and stored in the plurality of multiple data servers 300. That is, this one file may be striped in the plurality of data servers 300.

The data server 300 may report to the meta data server 200 about information on the state of the data server 300, for example, a size of the file stored and update time of the file stored and the like on a regular basis.

The client 100, meta data server 200, and data server 300 may be connected via the network 400.

Figure 2:
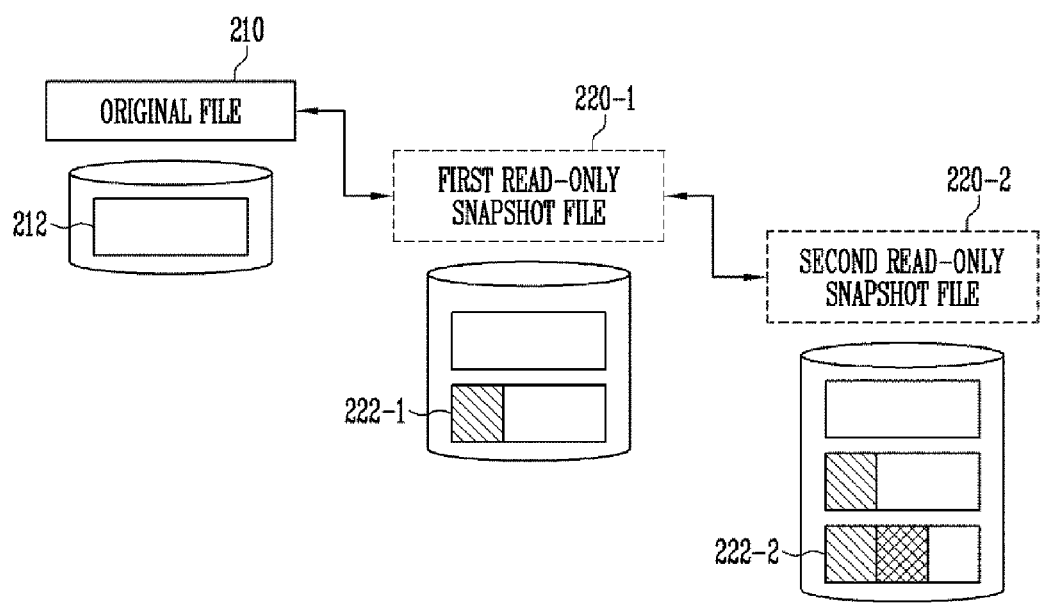
FIG. 2 is a view illustrating the concept of an original file and read-only snapshot files in a distributed file system according to an embodiment of the present disclosure.

FIG. 2 is a view illustrating the concept of a read-only snapshot file connected to an original file in a distributed file system according to an embodiment of the present disclosure.

For the sake of ease of explanation, a file of which data update is to be made by the client 100 will be called an original file 210.

Referring to FIGS. 1 and 2, the meta data server 300 generates read-only snapshot files 220-1 and 220-2 in order to store a state of the original file 210 at a point where a snapshot file of the original file 210 was generated. Therefore, even if data of the original file 210 is updated, the client 100 may return to the state of the file 210 at the point where the snapshot file was generated using the read-only snapshot files 220-1 and 220-2.

The read-only snapshot files 220-1 and 220-2 may be generated sequentially in real time at a request to generate a snapshot. Each of the generated read-only snapshot file 220-1 or 220-2 may include a state of the original file 210 at the point where the snapshot file was generated.

The read-only snapshot files 220-1 and 220-2 are generated in a same file format as the original file 210. When data of the original file 210 is updated, instead of updating the original file 210, the data server 300 may store the updated data in the read-only snapshot files 220-1 and 220-2 as snapshot delta chunks 222-1 and 222-2.

For example, when a first data update is made to the original file 210, the updated data may be stored in the first read-only snapshot file 220-1 as a first delta chunk 222-1. When a second data update is made to the original file 210, the updated data may be stored in the second read-only snapshot file 222-0 as a second delta chunk 222-2. The second read-only snapshot file 220-2 may store the first delta chunk 222-1 and the second delta chunk 222-2.

In an embodiment, the original file 210 and the read-only snapshot files 220-1 and 220-2 may be connected sequentially in the order they are generated.

For example, the original file 210 may be connected to the first read-only snapshot file 220-1, and the first read-only snapshot file 220-1 may be connected to the second read-only snapshot file 220-2. That is, the client 100 may approach the original file 210 using the first read-only snapshot file 220-1, and approach the original file to which the first update has been made using the second read-only snapshot file 220-2.

In another embodiment, the original file 210 may be connected to each of the read-only snapshot files 220-1 and 220-2, respectively.

For example, each of the first read-only snapshot file 220-1 and the second read-only snapshot file 220-2 may be connected to the original file 210, respectively. That is, the client 100 may approach the original file 210 using the first read-only snapshot file 220-1, or using the second read-only snapshot file 220-2.

Therefore, according to a method for providing a snapshot according to an embodiment of the present disclosure, the client 100 may approach the original file 210 of a certain point or the updated original file 210 using the read-only snapshot files 220-1 and 220-2 without changing the original file 210.

Figure 3:
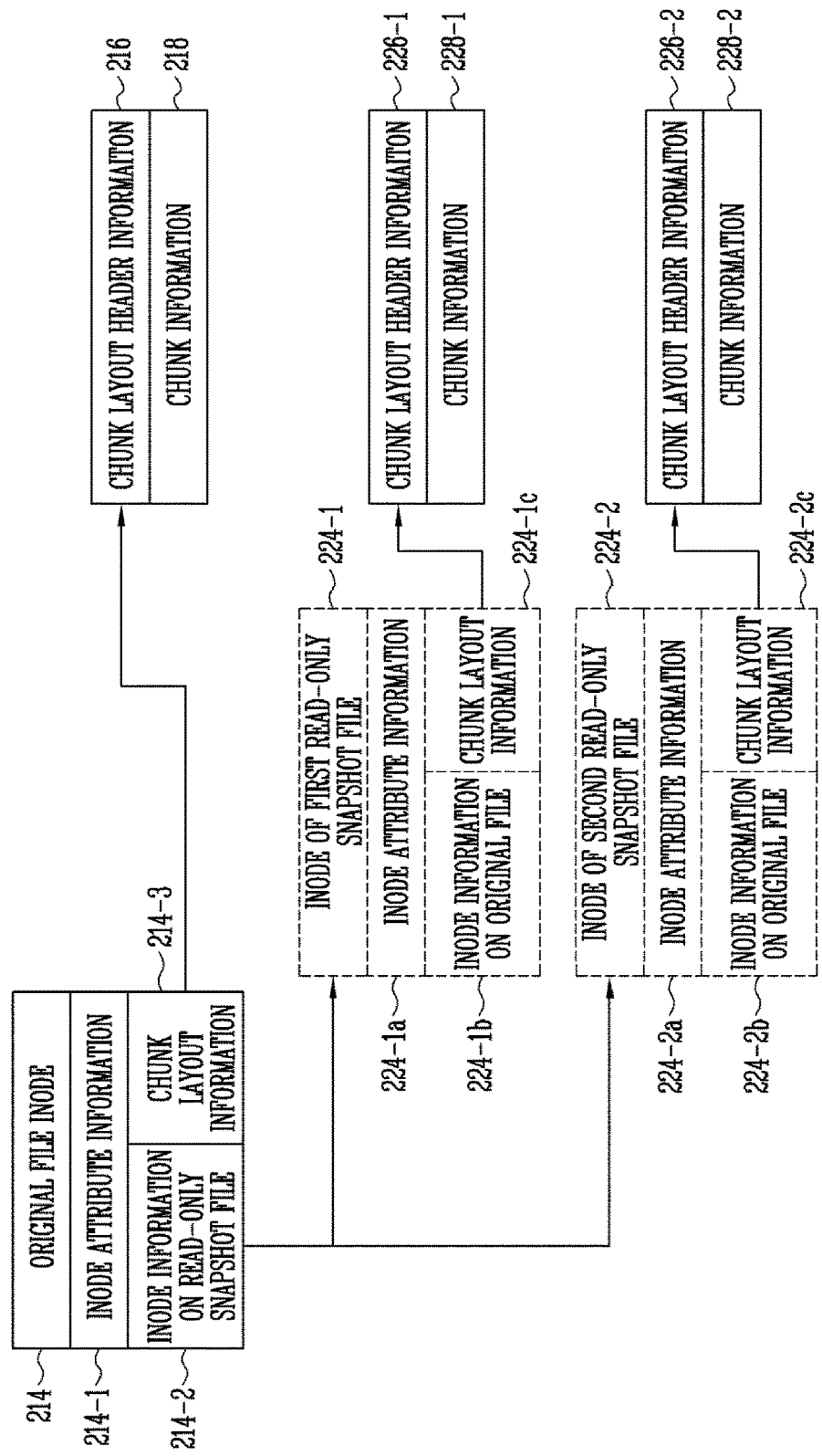
FIG. 3 is a view illustrating the concept of a method for providing a read-only snapshot in a distributed file system according to an embodiment of the present disclosure.

FIG. 3 is a view illustrating the concept of an inode structure of an original file and read-only snapshot file according to an embodiment of the present disclosure.

Referring to FIGS. 1 to 3, the meta data server 200 may manage the original file 210 and read-only snapshot files in an inode structure. The original file 210 and read-only snapshot files 220-1 and 220-2 may be connected to each other using an inode.

The inode of the original file 214 may include inode attribute information 214-1, inode information of the read-only snapshot file 214-2, and chunk layout information 214-3.

The inode attribute information 214-1 may include an inode identifier, file type, file mode, file size, file ownership, file approach, file change, update time and the like of the original file 210.

The inode information of the read-only snapshot file 214-2 may include identification information of the inode of the read-only snapshot file 224-1 connected to the inode of the original file 214. That is, the inode of the original file 214 may be connected to an inode of a certain read-only snapshot file using the inode information of the read-only snapshot file 214-2.

The chunk layout information 214-3 may include a number of the chunks, size of the chunks, and number of chunk copies and the like. The inode of the original file 214 may be connected to the original file 210 that has been divided into chunks using the chunk layout information 214-3.

The inodes of the read-only snapshot files 224-1 and 224-2 may include inode attribute information 224-1a and 224-2*a*, inode information of the original file 224-1*b* and 224-2*b*, and chunk layout information 224-1*c* and 224-2*b*.

The inode attribute information 224-1*a* and 224-2*a* may include inode identifiers, file types, file modes, file sizes, file ownerships, file approaches, file changes, and update times and the like of the read-only snapshot files 220-1 and 220-2.

The inode information of the original file 224-1*b* and 224-2*b* may include identification information of the original file 210. That is, the inodes of the read-only snapshot files 224-1 and 224-2 may be connected to the inode of the original file 214 using the inode information of the original file 224-1*b* and 224-2*b*.

In another embodiment, the inodes of the read-only snapshot file 224-1 and 224-2 may include inode information of the read-only snapshot files. For example, the inode of the first read-only snapshot file 224-1 may include inode information of the second read-only snapshot file, and the first read-only snapshot file 224-1 may be connected to the inode of the second read-only snapshot file 224-2 using the inode information of the second read-only snapshot file.

The chunk layout information 224-1*c* and 224-2*c* may include numbers of the delta chunks, sizes of the delta chunks, and numbers of delta chunk copies and the like of the read-only snapshot files 220-1 and 220-2. The inodes of the read-only snapshot file 224-1 and 224-2 may be connected to a delta chunk using the chunk layout information 224-1*c* and 224-2*c*.

For example, the inode of the first read-only snapshot file 224-1 may be connected to a first delta chunk 226-1 and 228-1 using a first chunk layout information 224-1*c*.

Figures 4, 5:
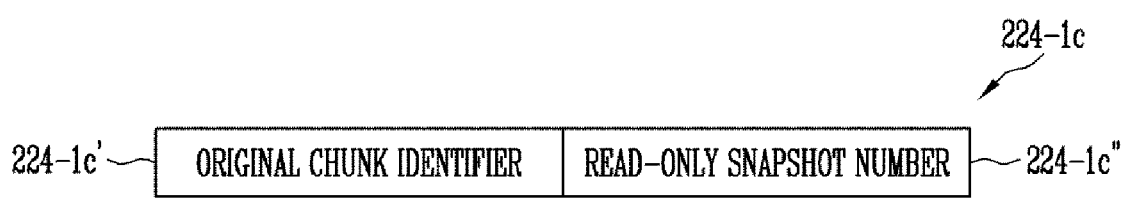
FIG. 4 is a view for explaining the concept of chunk layout information for identifying a delta chunk of a read-only snapshot file according to an embodiment of the present disclosure.
FIG. 5 is a view for explaining the concept of a method for identifying a delta chunk generated when an original file is updated in extent units.

FIG. 4 is a view illustrating the concept of chunk layout information for identifying a delta chunk of a first read-only snapshot file according to an embodiment of the present disclosure.

Referring to FIGS. 1 to 4, when updating the original file 210, the meta data server 200 may generate delta chunks 222-1 and 222-2 regarding the original file 210, and generate chunk layout information 224-1*c* and 224-2*c* for identifying the delta chunks 222-1 and 222-2. The chunk layout information 224-1*c* and 224-2*c* may include an original chunk identifier 224-1*c'* and read-only snapshot number 224-1*c'* in order to identify the delta chunks 222-1 and 222-2.

The meta data server 200 may identify the delta chunk using the original chunk identifier 224-1*c'* and read-only snapshot number 224-1*c"*.

For example, the meta data server 200 may identify the first delta chunk 222-1 using the chunk layout information of the first read-only snapshot file 224-1*c*. That is, the meta data server 200 may identify the chunk 212 of the original file using the original chunk identifier 224-1*c'*, and identify the first delta chunk 222-1, that is the data of the original file 210 where the first update has been made using the read-only snapshot number 224-1*c"*.

Therefore, the meta data server 200 may approach a chunk of the original file of the point where a certain snapshot was generated and a delta chunk using the original chunk identifier 224-1*c'* and read-only snapshot number 224-1*c"*.

FIG. 5 is a view illustrating the concept of a method for identifying a delta chunk generated when the original file is updated in extent units.

Referring to FIGS. 1 to 5, in a case where the original file is updated after a read-only snapshot file is generated, the data server may store the updated data in the delta chunk.

The data server 300 may update the delta chunk in extent units using a copy-on-write method. That is, the data server 300 may divide the chunk into extent units, and store an extent including the updated data in an extent of the delta chunks 222-1 and 222-2 of the read-only snapshot files 220-1 and 220-2.

Herein, in order to track after which read-only snapshot number a certain extent of the extents forming the chunk has been changed, the data server 300 may include an original chunk extent change map 218 that manages extent numbers and read-only snapshot numbers at an end of the chunk 212. Furthermore, the original chunk extent change map 218 may include the latest generated read-only snapshot number.

Figure 6:
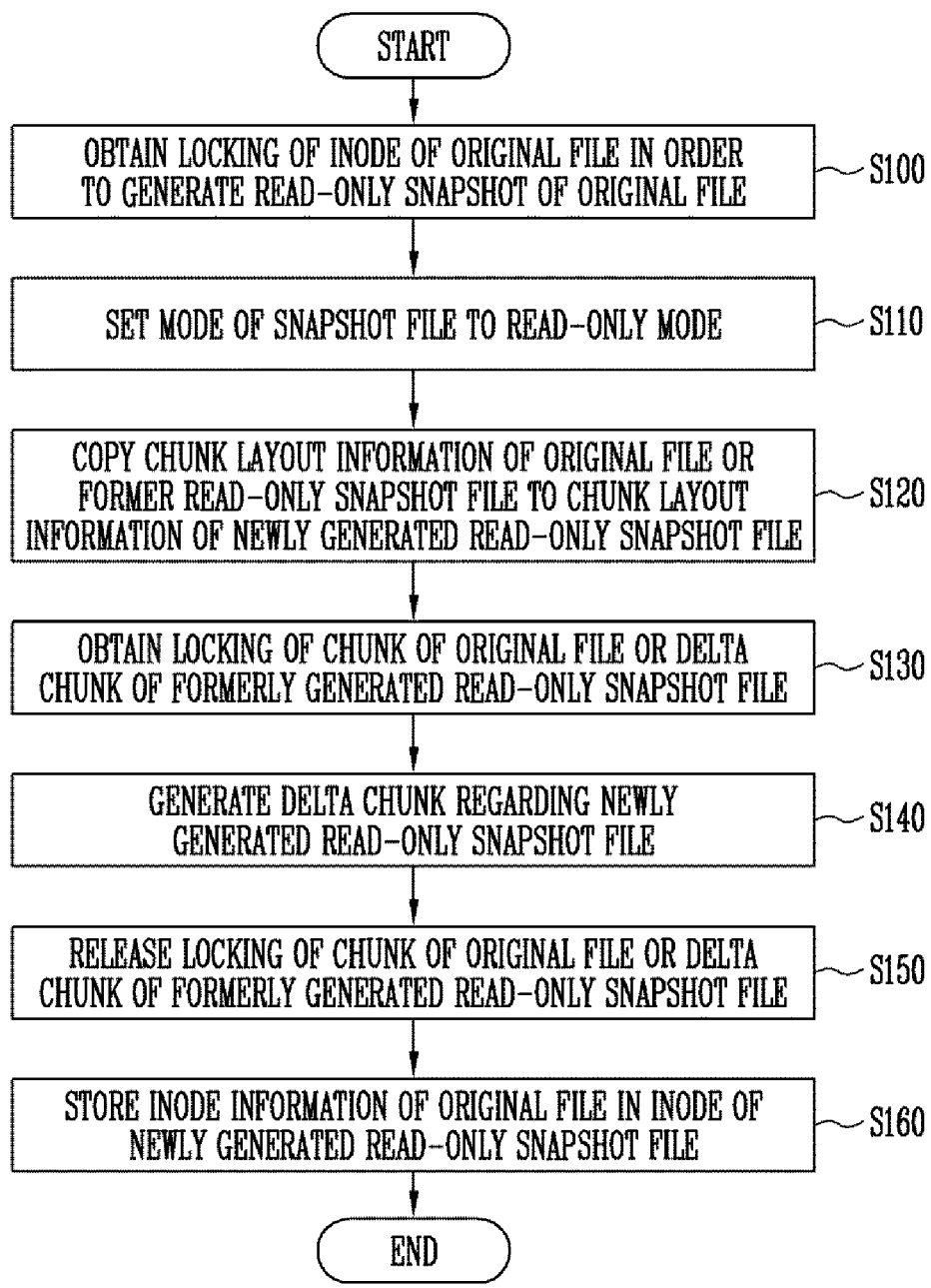
FIG. 6 is a flowchart for explaining a method for generating a read-only snapshot file according to an embodiment of the present disclosure.

FIG. 6 is a flowchart for explaining a method for generating a read-only snapshot file according to an embodiment of the present disclosure.

Referring to FIGS. 1 to 6, the meta data server 200 obtains locking of the original file inode 214 in order to generate the read-only snapshot files 220-1 and 220-2 of the original file 210 (S100), generates inodes of the read-only snapshot files 224-1 and 224-2, grants a read-only snapshot number 224-1*c"*, and then sets a mode of the snapshot file to a read-only file mode (S110).

The meta data server 200 copies chunk layout information of the original file 210 or a formerly generated read-only snapshot file to chunk layout information of a newly generated read-only snapshot file (S120).

Then, the meta data server 200 obtains locking of the chunk of the original file 212 or the delta chunk of the formerly generated read-only snapshot file 222-1 from all the data servers 300 storing the chunk of the original file 212 (S130), and generates a delta chunk regarding the newly generated read-only snapshot file 222-2 (S140).

Herein, when there is a data update, all the data servers 300 may store the updated data in the generated delta chunk 222-2, and reflect the updated data in the extent change map 218 of the original chunk.

The meta data server 200 may release the locking of the chunk of the original file 212 or the delta chunk of the formerly generated read-only snapshot file 222-1 in all the data servers 300 (S150), and store the inode information of the original file in the inode of the newly generated read-only snapshot file (S160).

Figure 7:
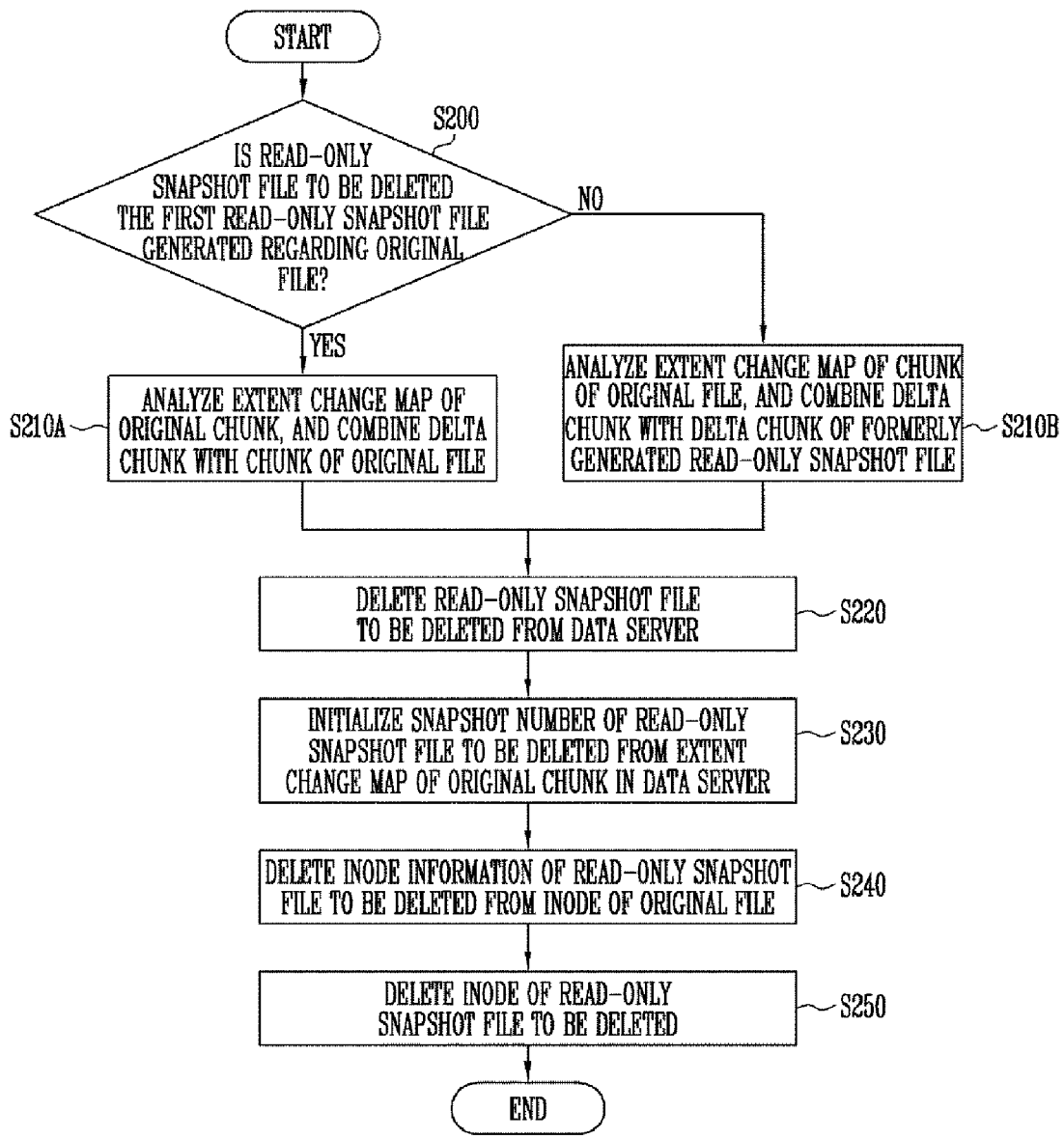
FIG. 7 is a flowchart for explaining a method for deleting a read-only snapshot file according to an embodiment of the present disclosure.

FIG. 7 is a flowchart for explaining a method for deleting a read-only snapshot file according to an embodiment of the present disclosure.

Referring to FIGS. 1 to 7, the meta data server 200 determines whether or not the read-only snapshot file to be deleted is the read-only snapshot file generated for the first time for the original file (S200).

In response to the read-only snapshot file to be deleted being the read-only snapshot file generated for the first time regarding the original file, the meta data server 200 analyzes the extent change map 218 of the original chunk in the data server 300, and combines the delta chunk storing the data that was changed after the read-only snapshot file to be deleted was generated with the original chunk of the original file 212 according to a result of the analysis (S210A).

In a case where the read-only snapshot file to be deleted is not the read-only snapshot file generated for the first time regarding the original file, the meta data server 200 analyzes the extent change map of the original chunk in the data server 300, and combines the delta chunk that stores the data that was changed after the read-only snapshot file to be deleted was generated with the delta chunk of a formerly generated read-only snapshot file according to a result of the analysis (S210B).

The meta data server 200 deletes the read-only snapshot file to be deleted from the data server 300 (S220).

The meta data server 200 initializes the snapshot number of the read-only snapshot file to be deleted from the extent change map 218 in the data server 300 (S230), and deletes the inode information of the read-only snapshot file to be deleted from the inode of the original file (S240).

Lastly, the meta data server 200 deletes the inode of the read-only snapshot file to be deleted (S250).

Figure 8:
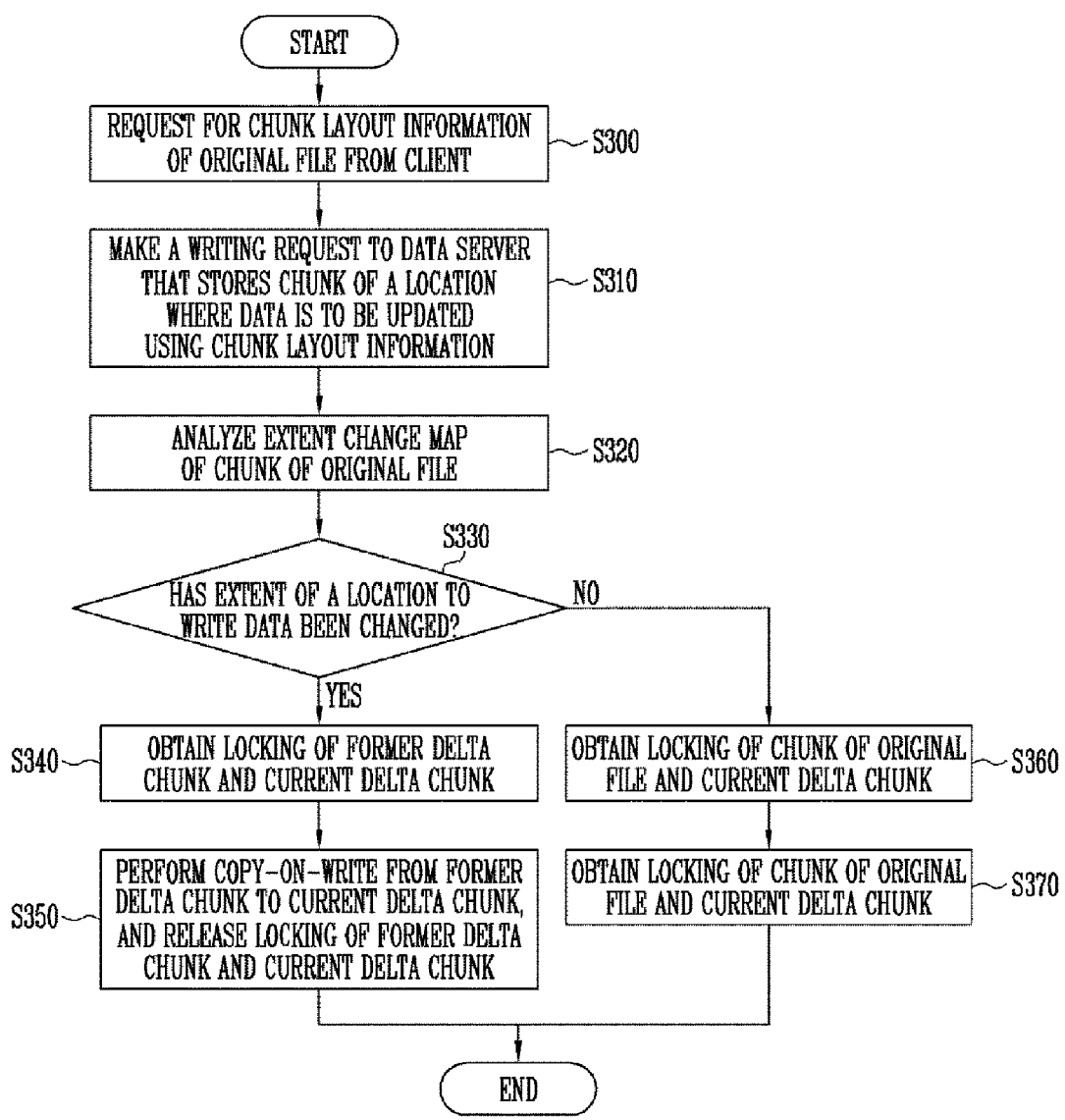
FIG. 8 is a flowchart for explaining a method for updating an original file after a read-only snapshot file is generated according to an embodiment of the present disclosure.

FIG. 8 is a flowchart for explaining a method for updating an original file after a read-only snapshot file has been generated according to an embodiment of the present disclosure.

Referring to FIGS. 1 to 8, the meta data server 200 may receive a request to write the original file from the client 100 after a read-only snapshot file has been generated. That is, the meta data server 200 receives a request for chunk layout information of the original file from the client 100 (S300), and the client 100 makes a writing request to the data server 300 that stores the chunk of the location where the data is to be updated using the chunk layout information received from the meta data server 200 (S310).

The data server 300 analyzes the extent change map 218 of the original chunk (S320), and inspects whether or not the extent of the location where the data is to be used has been changed (S330).

In response to inspecting that the extent has been changed, the data server 300 obtains locking of the delta chunk of the read-only snapshot file that includes the latest changed data and the delta chunk of the current read-only snapshot file (S340).

The data server 300 performs a copy-on-write of an extent unit from the delta chunk of the formerly changed read-only snapshot file to the delta chunk of the current read-only snapshot file, and then releases the locking of the delta chunk of the formerly changed read-only snapshot file and the delta chunk of the current read-only snapshot file (S350).

If the extent has not been changed, it means that the data has never been updated from the chunk of the original file 212, and thus the data server 300 may obtain locking of the chunk of the original file and the locking of the delta chunk of the current read-only snapshot file (S360).

After performing the copy-on-write from the chunk of the original file to the delta chunk of the current read-only snapshot file, the data server 300 releases the locking of the chunk of the original file 212 and the locking of the delta chunk of the current read-only snapshot file (S370).

Lastly, the data server 300 may track the latest changed location by setting the current snapshot number regarding the extent in the original chunk extent change map 218 (S380).

Figure 9:
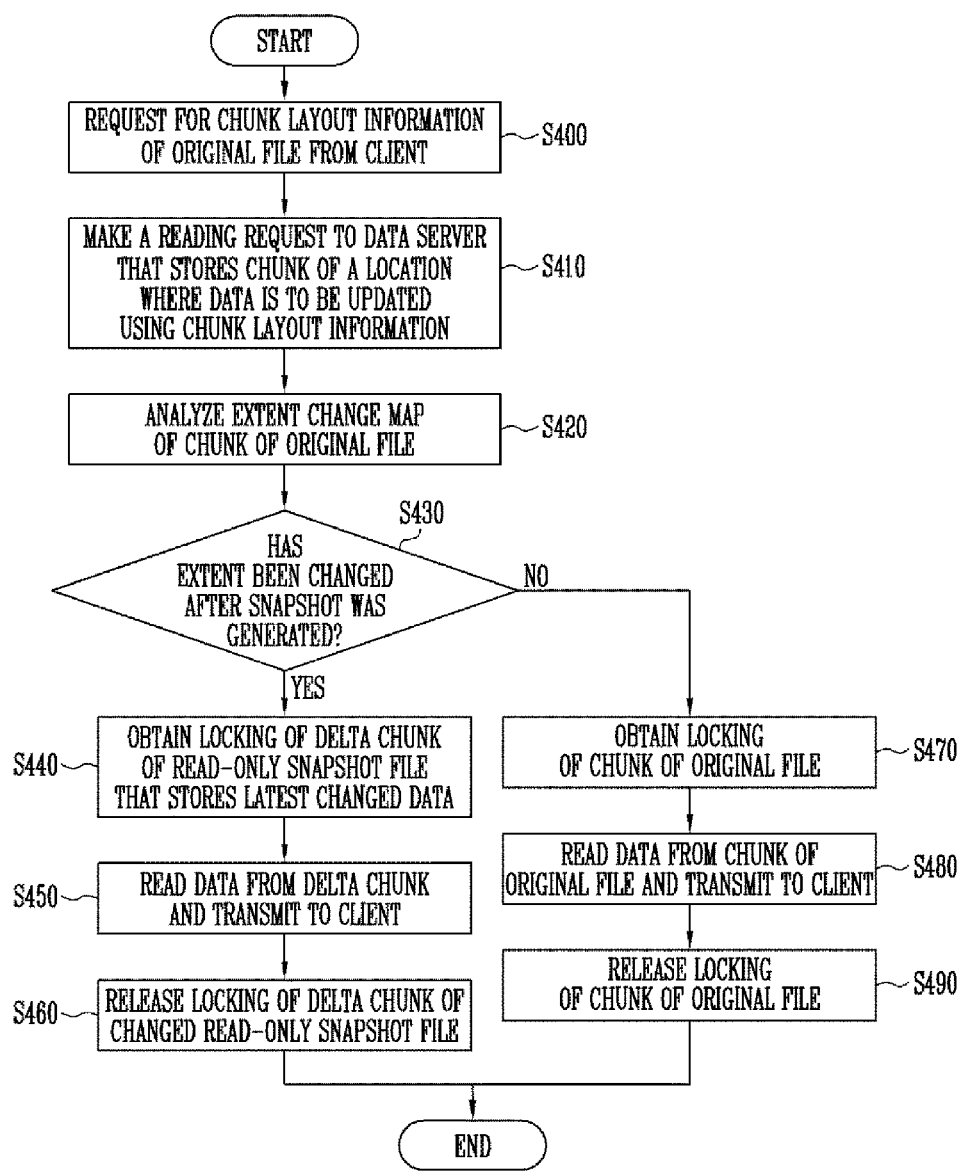
FIG. 9 is a flowchart for explaining a method for performing a reading operation of an original file after a read-only snapshot file is generated according to an embodiment of the present disclosure.

FIG. 9 is a flowchart for explaining a method for performing a reading operation regarding an original file after generating a read-only snapshot file according to an embodiment of the present disclosure.

Referring to FIGS. 1 to 9, after a read-only snapshot file is generated, the meta data server 200 may receive a request to read the original file from the client 100. That is, the meta data server 200 receives a request for chunk layout information of the original file 214-3 from the client 100 (S400), and the client 100 makes a data writing request to the data server 300 using the chunk layout information 214-3 received from the meta data server 200 (S410).

The data server 300 analyzes the extent change map 218 of the original chunk (S420), and inspects whether or not the extent has been changed after the snapshot was generated (S430).

If it is inspected that the extent has been changed, the data server 300 obtains locking of the delta chunk of the read-only snapshot file storing the latest changed data (S440).

The data server 300 reads the data from the delta chunk of the read-only snapshot file and transmits the read data to the client 100 (S450), and releases the locking of the delta chunk of the latest changed read-only snapshot file (S460).

The extent having not been changed means that the chunk of the original file 212 was not updated once since the read-only snapshot file was generated, and thus the data server 300 obtains the locking of the chunk of the original file 212 (S470), reads the data from the chunk of the original file and transmits the read data to the client 100 (S480), and then releases the locking of the chunk of the original file 212 (S490).

Figure 10:
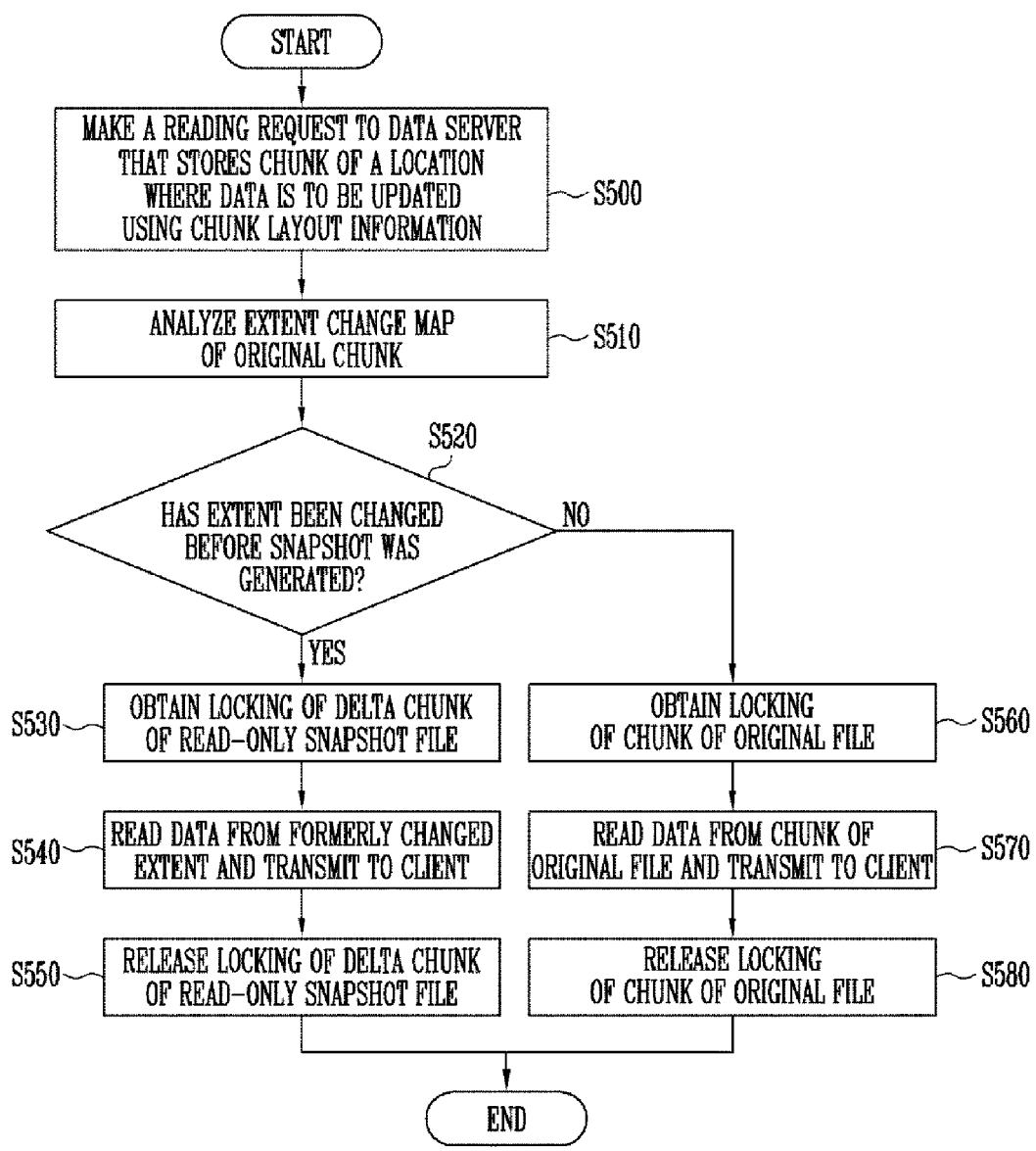
FIG. 10 is a flowchart for explaining a method for performing a reading operation for a read-only snapshot file according to an embodiment of the present disclosure.

FIG. 10 is a flowchart for explaining a method for performing a reading operation regarding a read-only snapsnot file according to an embodiment of the present disclosure.

Referring to FIGS. 1 to 10, the client 100 receives chunk layout information of the read-only snapshot file from the meta data server 200, and transmits a request to read data to the data server 300 using the chunk layout information (S500).

The data server 300 analyzes the extent change map 218 of the original chunk (S510), and inspects whether or not the extent has been changed before the read-only snapshot file was generated (S520).

If it is inspected that the extent has been changed before the read-only snapshot file was generated, the data server 300 obtains locking of the delta chunk of the read-only snapshot file storing the formerly changed extent (S530), reads the data from the formerly changed extent and transmits the data to the client 100 (S540), and releases the locking of the delta chunk of the read-only snapshot file storing the formerly changed extent (S550).

If it is inspected that the extent has not been changed, the data server 300 obtains locking of the chunk of the original file 212 (S560), reads the data from the chunk of the original file 212 and transmits the read data to the client 100 (S570), and releases the locking of the chunk of the original file 212 (S580).

Figure 11:
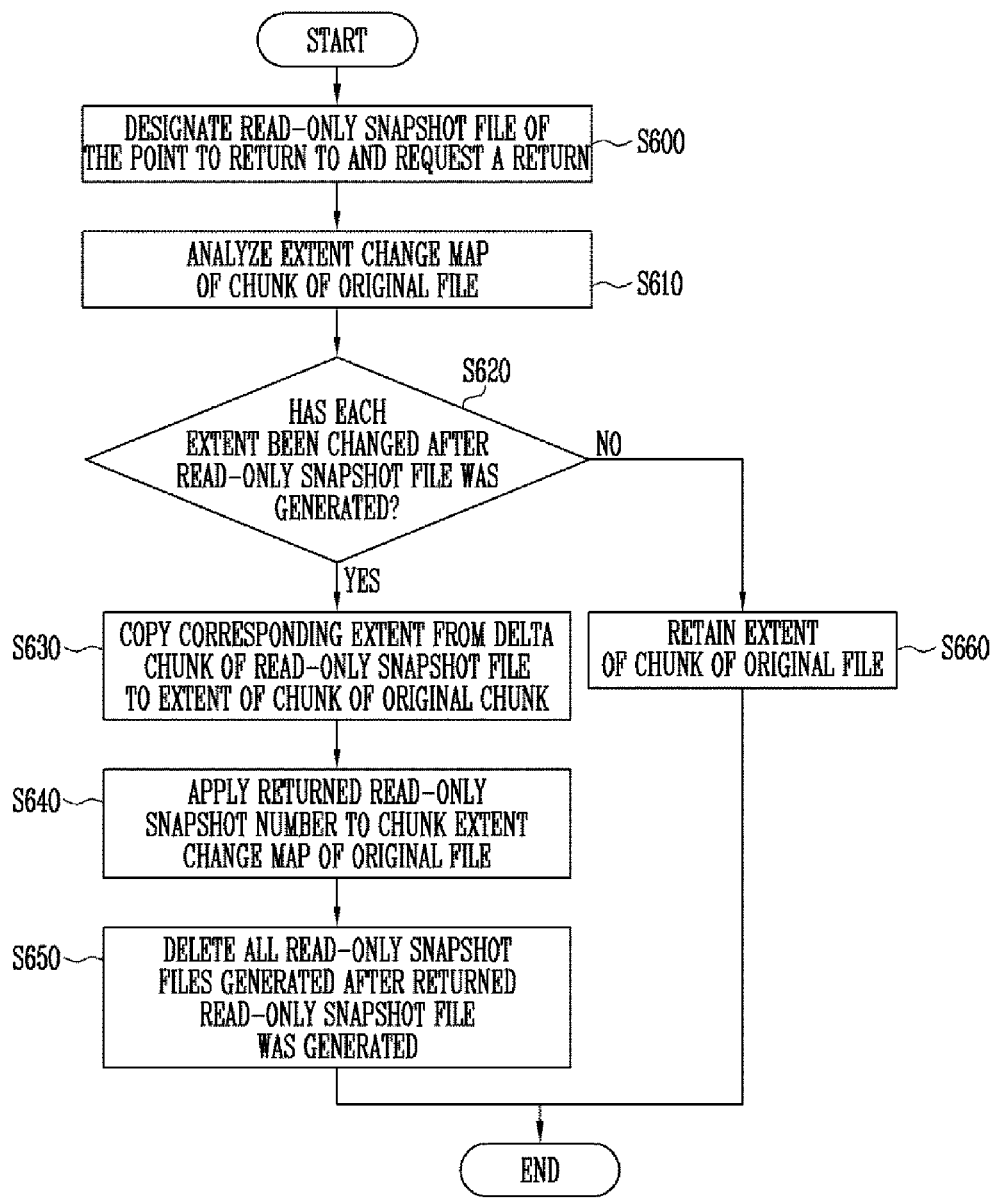
FIG. 11 is a flowchart for explaining an operation of processing a return to a read-only snapshot file according to an embodiment of the present disclosure.

FIG. 11 is a flowchart for explaining an operation of processing a return to a read-only snapshot file according to an embodiment of the present disclosure.

A snapshot return may be used to return the original file to a read-only snapshot file of the original file of a certain point due to system error or management issues.

Referring to FIGS. 1 to 11, the meta data server 200 designates a read-only snapshot file of the certain point to return to and makes a return request (S600).

The data server 300 analyzes the extent change map of the original chunk regarding the chunks of the original file stored (S610), and determines whether or not each extent has been changed after the read-only snapshot file to return to was generated (S620).

If the latest changed read-only snapshot number is greater than the read-only snapshot file to return to, the data server 300 determines that the extent has been changed after the read-only snapshot file to return to was generated.

When it is determined that the extent has been changed after the read-only snapshot file to return to was generated, the data server 300 copies the corresponding extent from the delta chunk of the read-only snapshot file of the closest point from the read-only snapshot file to return to to the extent of the original chunk (S630).

When the copying is completed, the data server 300 applies the returned read-only snapshot number to the original chunk extent map 218 (S640). Lastly, the meta data server 200 deletes all the read-only snapshot files generated after the returned read-only snapshot file was generated (S650).

When it is determined that the extent has not been changed after the read-only snapshot file to return to was generated, the data server 300 retains the extent of the original chunk 218 as it is (S660).

Figure 12:
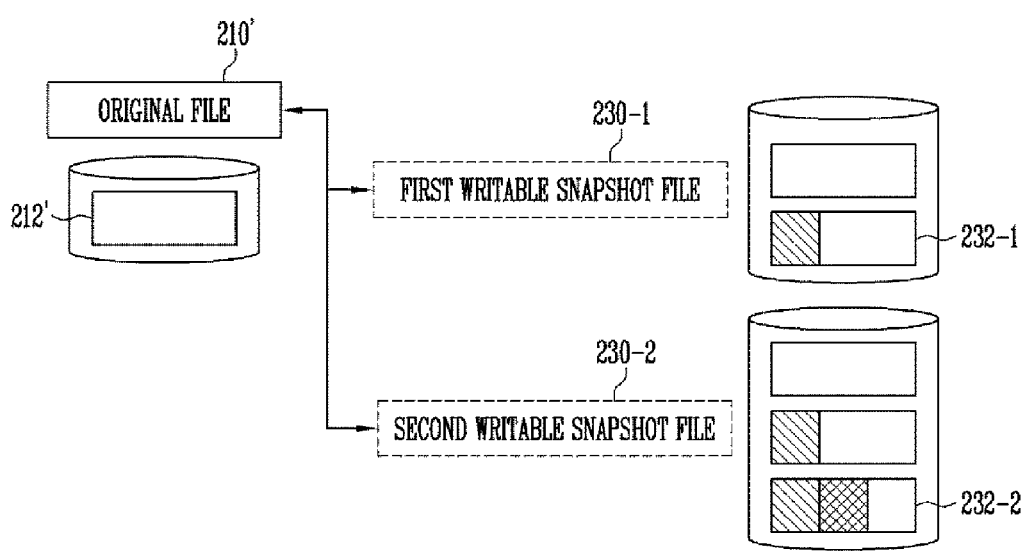
FIG. 12 is a view illustrating the concept of an original file and a writable snapshot file in a distributed file system according to an embodiment of the present disclosure.

FIG. 12 is a view illustrating the concept of an original file and a writable snapshot file in a distributed file system according to an embodiment of the present disclosure.

Referring to FIGS. 1 to 12, a snapshot according to an embodiment of the present disclosure may be managed as a read-only or writable snapshot depending on its characteristics, and both types of snapshots may share meta data of the original file data. The aforementioned read-only snapshot file may only perform a reading operation of the file data at the point where the snapshot file was generated, and the original file may be continuously changed. However, the writable snapshot file is capable of reading and writing of the writable snapshot file after the snapshot file was generated.

That is, changes to the original file 210' are not reflected in the writable snapshot files 230-1 and 230-2, and changes to the writable snapshot files 230-1 and 230-2 are not reflected in the original file. Therefore, the changed data of the chunk of the original file 212' is stored as delta chunks 232-1 and 232-2 of the writable snapshot file as in the case of the read-only snapshot files 220-1 and 220-2. When changing the data of the writable snapshot files 230-1 and 230-2, a copy-on-write is performed using the chunk of the original file 212' and the writable snapshot delta chunks 232-1 and 232-2.

Figure 13:
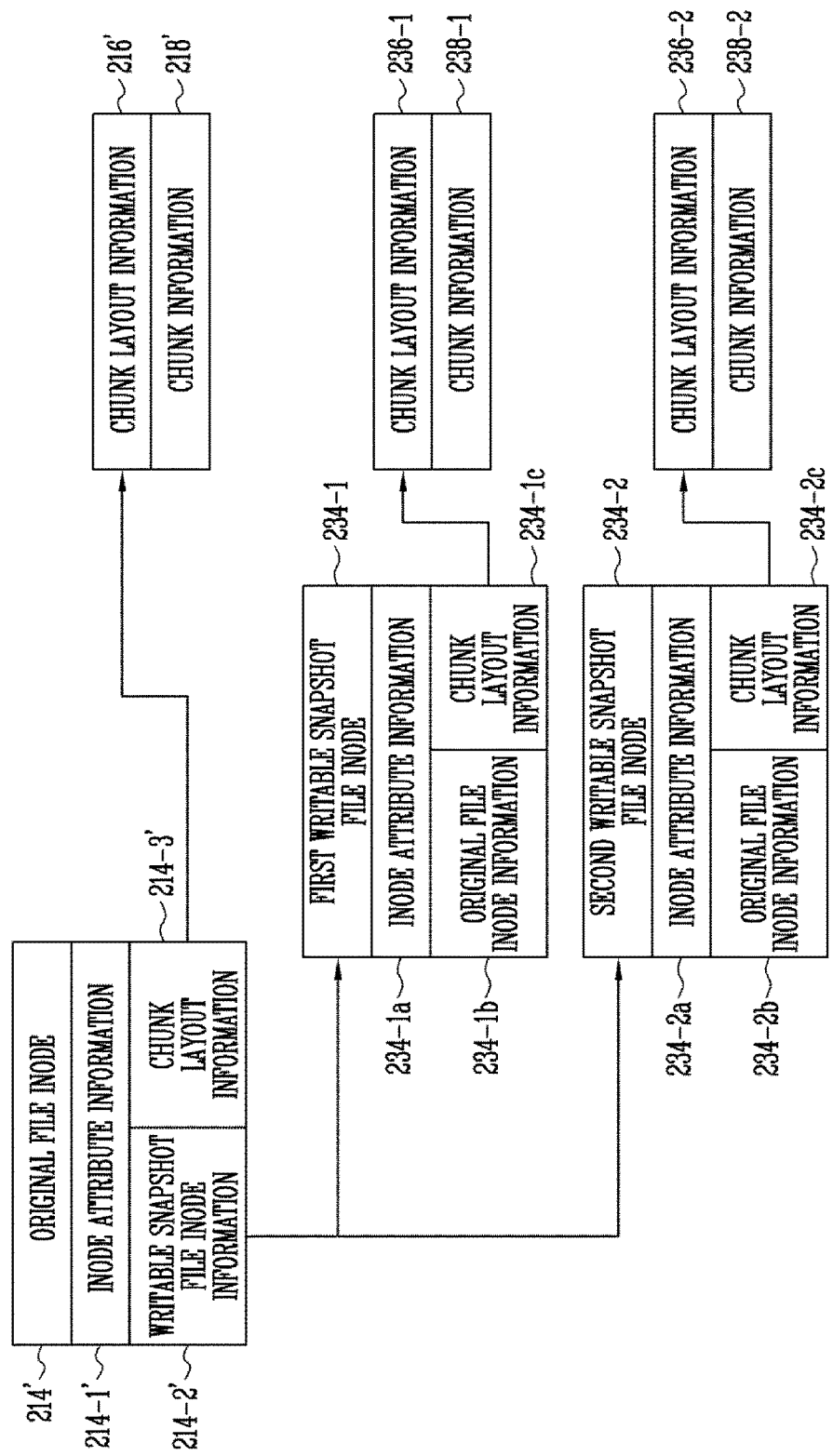
FIG. 13 is a view illustrating the concept of an inode structure of an original file and a read-only snapshot file according to an embodiment of the present disclosure.

FIG. 13 is a view illustrating the concept of an inode structure of an original file and a writable snapshot file according to an embodiment of the present disclosure.

Referring to FIGS. 1 and 13, the meta data server 300 may manage the original file 210' and the writable snapshot files 230-1 and 230-2 in the inode structure. The original file 210' and writable snapshot files 230-1 and 230-2 may be connected to each other using an inode.

The inode of the original file 214' may include inode attribute information 214-1', inode information of the writable snapshot file 214-2', and chunk layout information 214-3'.

The inode attribute information 214-1' and chunk layout information 214-3' perform the same functions as the inode attribute information 214-1 and chunk layout information 214-1 of FIG. 3 mentioned above, and thus repeated explanation is omitted.

The inode information of the writable snapshot file 214-2' may include identification information of the inodes 234-1 and 234-2 of the writable snapshot file connected to the inode of the original file 214'. That is, the inode of the original file 214' may be connected to the inode of a certain writable snapshot file using the inode information of the writable snapshot file 214-2'.

The inodes 234-1 and 234-2 of the writable snapshot file may include inode attribute information 234-1*a* and 234-2*a*, inode information of the original file 234-1*b* and 234-2*b*, and chunk layout information 234-1*c* and 234-2*c*.

The inode attribute information 234-1*a* and 234-2*a*, inode information of the original file 234-1*b* and 234-2*b*, and chunk layout information 234-1*c* and 234-2*c* perform the same functions as the inode attribute information 224-1*a* and 224-2*a*, inode information of the original snapshot file 224-1*b* and 224-2*b*, and chunk layout information 224-1*c* and 224-2*c* illustrated in FIG. 3, and thus repeated explanation is omitted.

Figure 14:
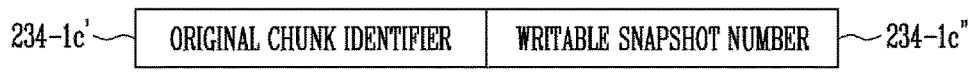
FIG. 14 is a view illustrating the concept of chunk layout information for identifying a delta chunk of a writable snapshot file according to an embodiment of the present disclosure.

FIG. 14 is a view illustrating the concept of chunk layout information for identifying a delta chunk of a writable snapshot file according to an embodiment of the present disclosure.

Referring to FIGS. 1, 12, 13, and 14, the meta data server 200 may identify a delta chunk using an original chunk identifier 234-1*c'* and writable snapshot number 234-1*c"*.

For example, the meta data server 200 may identify the delta chunk using the chunk layout information 234-1*c* of the writable snapshot file. That is, the meta data server 200 may identify the chunk of the original file 212' using the original chunk identifier 234-1*c'*, and identify the delta chunk, that is the updated data of the original file 210' using the writable snapshot number 234-1*c"*.

Figure 15:
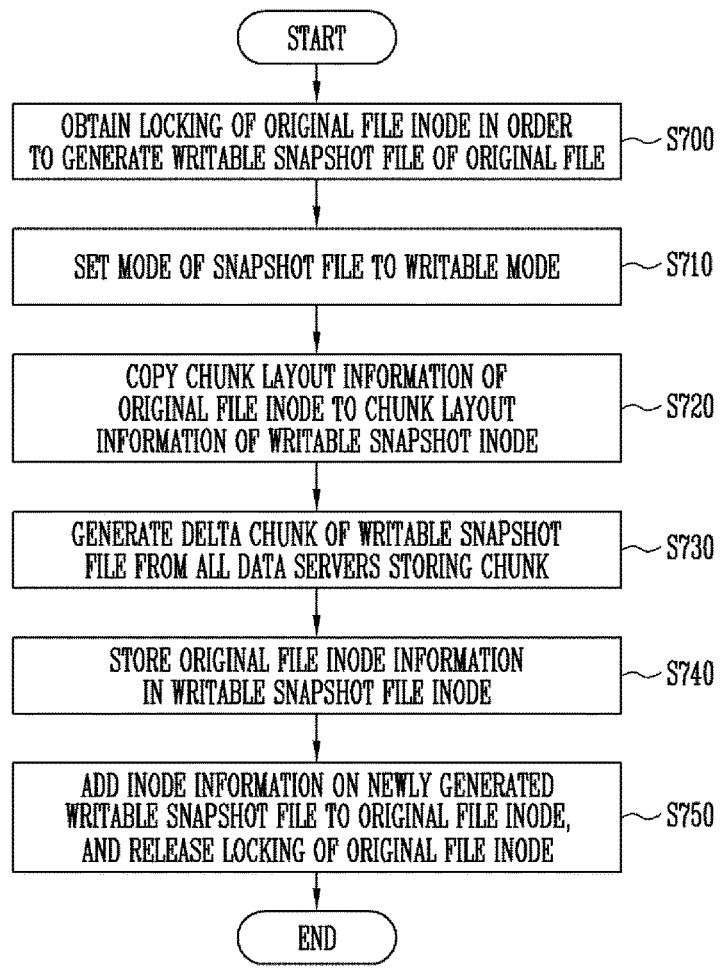
FIG. 15 is a flowchart for explaining a method for generating a writable snapshot file according to an embodiment of the present disclosure.

FIG. 15 is a flowchart for explaining a method for generating a writable snapshot file according to an embodiment of the present disclosure.

Referring to FIGS. 1, 12, 13, 14, and 15, the meta data server 200 obtains locking of the original file inode 214' in order to generate a writable snapshot file regarding the original file 210' (S700), generates inodes of the writable snapshot file 234-1 and 234-2, and sets the mode of the writable snapshot file to a writable mode (S710).

The meta data server 200 copies the chunk layout information of the original file inode 214-3' to the chunk layout information 234-1*c* and 234-2*c* of the inode of the writable snapshot file (S720).

Then, the meta data server 200 generates delta chunks of the writable snapshot file 232-1 and 232-2 in all the data servers 300 storing the chunk with reference to the chunk layout 214-3' (S730).

The meta data server 200 may store the original file inode information 234-1*b* and 234-2*b* in the inodes of the writable snapshot file 234-1 and 234-2 (S740).

Lastly, the meta data server 200 adds the inode information of the newly generated writable snapshot file to the original file inode 214', and releases the locking of the original file inode 214' (S750).

Figure 16:
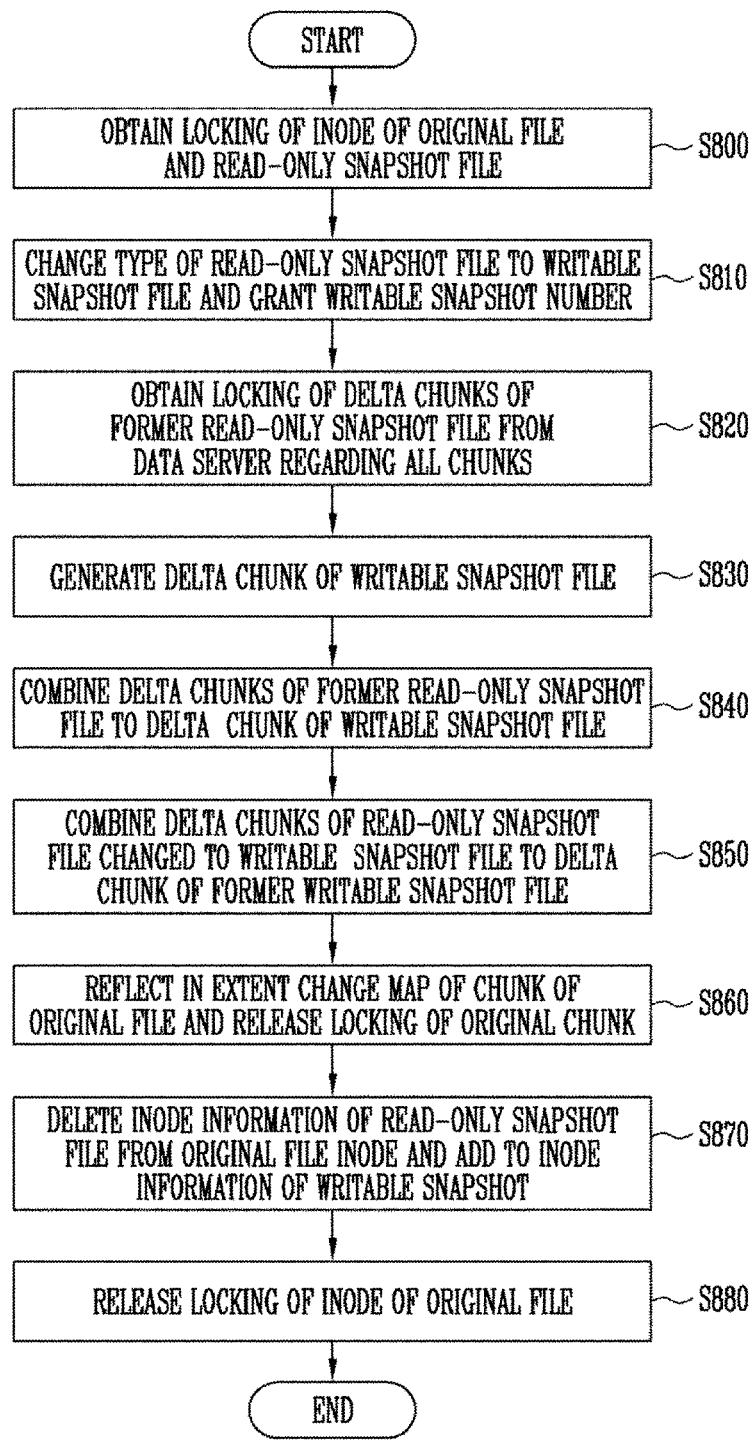
FIG. 16 is a flowchart for explaining a process of converting a read-only snapshot file into a writable snapshot file according to an embodiment of the present disclosure.

FIG. 16 is a flowchart for explaining a process of converting a read-only snapshot file into a writable snapshot file according to an embodiment of the present disclosure.

Referring to FIGS. 1 to 16, the read-only snapshot files 220-1 and 220-2 may be converted into writable snapshot files 230-1 and 230-2. The meta data server 200 may obtain locking of the inode of the original file 214 and the inodes of the read-only snapshot file 224-1 and 224-2 (S800).

The meta data server 200 may change the type of the read-only snapshot file to a writable snapshot file (S810).

The meta data server 200 may obtain locking of the delta chunk of the former read-only snapshot file from all the data servers 300 with reference to the chunk layout information the read-only snapshot file 224-1*c* and 224-2*c* (S820), and generate a delta chunk of the writable snapshot file (S830).

The data server 300 may combine the delta chunk of the former read-only snapshot file with the delta chunk of the writable snapshot file (S840).

Furthermore, the delta chunks of the read-only snapshot file changed to the writable snapshot file may be combined with the delta chunk of the former writable snapshot file (S850).

The data server 300 may reflect in the extent change map 218 of the original chunk and release the locking of the chunk of the original file 210 (S860).

The meta data server 200 may delete the inode information of the read-only snapshot file 214-2 from the original file inode 214, and add the deleted inode information of the read-only snapshot file 214-2 to the writable snapshot inode information 214-3' (S870). Lastly, the meta data server 200 may release the locking of the original file inode 214 (S880).

Figure 17:
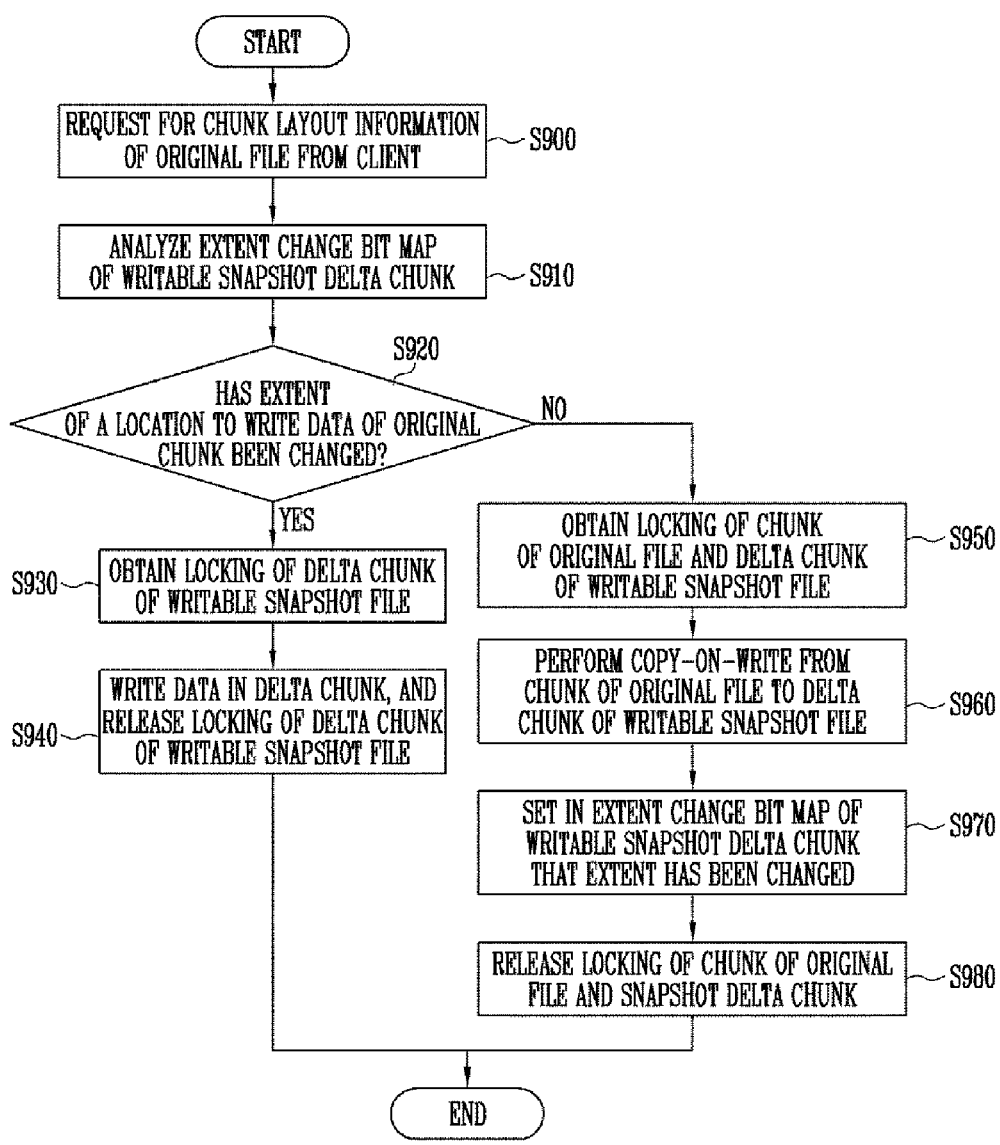
FIG. 17 is a flowchart for explaining a writing operation regarding a writable snapshot file according to an embodiment of the present disclosure.

FIG. 17 is a flowchart for explaining a writing operation regarding a writable snapshot file according to an embodiment of the present disclosure.

Referring to FIGS. 1, 12, 13, 14, 15, 16, and 17, the client 100 may make a data writing request to the data server 300 using the chunk layout information of the writable snapshot file received from the meta data server 200 (S900).

The data server 300 may analyze the extent change bit map of the writable snapshot delta chunk (S910), and inspect whether or not the extent has been changed in order to write data (S920).

If it is inspected that the extent has been changed, the data server 300 may obtain locking of the delta chunk of the writable snapshot file (S930), write data in the delta chunk, and then release the locking of the delta chunk of the writable snapshot file (S940).

If it is inspected that the extent has not been changed, the data server 300 may obtain locking of the chunk of the original file and the delta chunk of the writable snapshot file (S950), and perform a copy-on-write from the chunk of the original file to the delta chunk of the writable snapshot file (S960).

The data server 300 may set such that the extent has been changed in the extent change bit map of the writable snapshot delta chunk (S970), and release the locking of the chunk of the original file and the snapshot delta chunk (S980).

Figure 18:
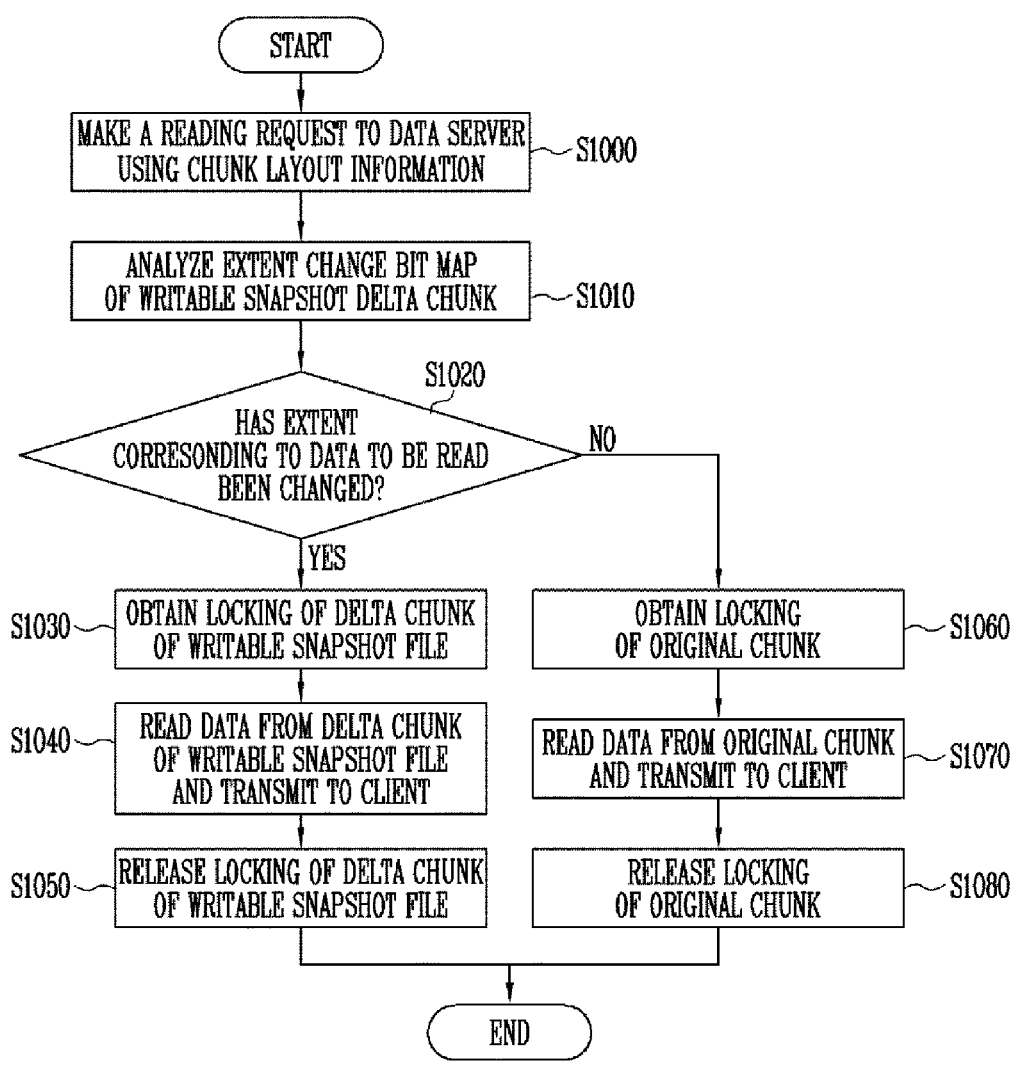
FIG. 18 is a flowchart illustrating a process of reading or writable snapshot file according to an embodiment of the present disclosure.

FIG. 18 is a flowchart illustrating a process of reading a writable snapshot file according to an embodiment of the present disclosure.

Referring to FIGS. 1, 12, 13, 14, 15, 16, 17, and 18, the meta data server 200 may receive a request for chunk layout information of the snapshot from the client 100 to read data from the writable snapshot file, and make a reading request to the data server 300 using the chunk layout information received from the meta data server 200 (S1000).

The data server 300 may analyze the extent change bit map of the writable snapshot delta chunk (S1010), and inspect whether or not the extent corresponding to the data to be read has been changed (S1020).

When it is inspected that the extent has been changed, the data server 300 may obtain locking of the delta chunk of the writable snapshot file (S1030), read the data from the delta chunk of the writable snapshot file and transmit the data to the client 100 (S1040), and release the locking of the delta chunk of the writable snapshot file (S1050).

When it is inspected that the extent has not been changed, the data server 300 may obtain locking of the chunk of the original file (S1060), read the data from the chunk of the original file and transmit the data to the client 100 (S1070), and release the locking of the chunk of the original file (S1080).

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:
1. A distributed file system comprising:
a meta data server configured to store and manage meta data of a data file; and
a data server configured to store and manage data and attribute information of the data file,
wherein the meta data server, based on receiving a write request from a client, generates an inode data structure to connect an original file and a read-only snapshot file,
wherein the original file corresponds to the data file in an original state,
wherein the read-only snapshot file includes a delta chunk of data requested to be changed by the write request from the client,
wherein the inode data structure includes an original file inode and an inode of the read-only snapshot file,
wherein the original file inode includes inode information of the inode of the read-only snapshot file and chunk layout information of the original file, the chunk layout information including one or more of a number of chunks, a size of chunks, and a number of chunk copies of chunks of the original file, and
wherein the inode of the read-only snapshot file includes inode information of the original file.

2. The distributed file system according to claim 1, wherein the meta data server
sets a mode of the snapshot file to a read-only mode,
generates a read-only snapshot file inode,
copies chunk layout information of the original file, or chunk layout information of a formerly generated read-only snapshot file, to chunk layout information of the read-only snapshot file inode,
generates the delta chunk using the chunk layout information of the read-only snapshot file, and
stores inode information of the original file in the read-only snapshot file inode.

3. The distributed file system according to claim 1, wherein, the meta data server transmits the chunk layout information of the original file to the client in response to a request for chunk layout information transmitted from the client.

4. The distributed file system according to claim 1, wherein the meta data server
determines whether any read-only snapshot file corresponding to the data file has previously been generated,
analyzes an extent change map of a chunk of the original file in the data server based on determining that no read-only snapshot file corresponding to the data file has been previously generated,
associates, in a read-only snapshot file inode, the delta chunk of data requested to be changed with the chunk of the original file, and
deletes the read-only snapshot file from the data server.

5. The distributed file system according to claim 4, wherein the data server
analyzes the extent change map of the chunk of the original file based on determining that the read-only snapshot file is not generated for the first time, and
associates, in a read-only snapshot file inode, the delta chunk with a delta chunk of a formerly generated read-only snapshot file corresponding to the data file.

6. The distributed file system according to claim 1, wherein the data server analyzes an extent change map of an original chunk stored in the data server in response to a request to update the original file, checks whether an extent of a location where data is to be written in the chunk of the original file has been changed, performs a copy-on-write of an extent unit from a previously-generated delta chunk of a formerly changed read-only snapshot file to the delta chunk of the data requested to be changed by the write request from the client if the extent of the location has been changed, and performs a copy-on-write of an extent unit from the previously-generated delta chunk to the chunk of the original file and the delta chunk of the data requested to be changed by the write request from the client if the extent of the location has not been changed.

7. The distributed file system according to claim 1, wherein the data server sets a current snapshot number regarding an extent of an extent change map of a chunk of the original file in order to track a location of the latest changes to the original file.

8. A distributed file system comprising:

a meta data server configured to store and manage meta data of a data file; and a data server configured to store and manage data and attribute information of the data file, wherein the meta data server sets a mode of a snapshot file to one of a read-only mode and writable mode in response to a writing request from a client, and stores data requested to be changed in chunk units according to a result of the setting, and associates, in an inode structure, an original file corresponding to the data file in an original state and the snapshot file, wherein the original file inode includes inode information of the inode of the snapshot file and chunk layout information of the original file, the chunk layout information including one or more of a number of chunks, a size of chunks, and a number of chunk copies of chunks of the original file, and wherein the inode of the snapshot file includes inode information of the original file.

9. The distributed file system according to claim 8, wherein, the meta data server stores the data requested to be changed in a delta chunk of a read-only snapshot file if the mode of a snapshot file is a read-only mode, and associates, in the inode structure, the original file and the read-only snapshot file.

10. The distributed file system according to claim 8, wherein the meta data server stores the data requested to be changed to a delta chunk of a writable snapshot file without changing the original file if the mode of a snapshot file is a writable mode, and associates, in the inode structure, the original file and the writable snapshot file.

11. The distributed file system according to claim 10, wherein the meta data server generates the inode structure of the writable snapshot file, copies chunk layout information of an inode of the original file to chunk layout information of the inode structure of the writable snapshot file, generates a delta chunk of the writable snapshot file in the data server using the chunk layout information of the inode structure of the writable snapshot file, and stores inode information of the original file in the inode structure of the writable snapshot file.

12. The distributed file system according to claim 10, wherein the data server analyzes an extent change map of the writable snapshot delta chunk in response to the writing request and inspects whether an extent for writing data has been changed, writes the data in the delta chunk if the extent has been changed, and performs a copy-on-write from the chunk of the original file to the delta chunk if the extent has not been changed.

\* \* \* \* \*